(12) United States Patent
Iizuka et al.

(10) Patent No.: US 8,819,888 B2
(45) Date of Patent: Sep. 2, 2014

(54) WIPER APPARATUS

(75) Inventors: Takamichi Iizuka, Farmington Hills, MI (US); Atsuhiro Kuwabara, Frankfurt am Main (DE)

(73) Assignee: Mitsuba Corporation, Kiryu-shi, Gunma (JP)

( * ) Notice: Subject to any disclaimer, the term of this patent is extended or adjusted under 35 U.S.C. 154(b) by 104 days.

(21) Appl. No.: 13/530,341

(22) Filed: Jun. 22, 2012

(65) Prior Publication Data

US 2013/0340193 A1    Dec. 26, 2013

(51) Int. Cl.
*B60S 1/06*    (2006.01)
*B60S 1/16*    (2006.01)

(52) U.S. Cl.
USPC ............. 15/250.31; 15/250.3; 15/250.27; 296/96.17

(58) Field of Classification Search
USPC ............ 15/250.3, 250.31, 250.27, 250.28; 296/96.15, 96.17
See application file for complete search history.

(56) References Cited

U.S. PATENT DOCUMENTS

| 6,292,975 | B1 * | 9/2001 | Isii et al. ............... | 15/250.31 |
| 6,553,606 | B1 * | 4/2003 | Kanazawa et al. ......... | 15/250.31 |
| 6,687,947 | B2 * | 2/2004 | Sato et al. ............. | 15/250.31 |
| 6,886,212 | B2 * | 5/2005 | Machida ............... | 15/250.3 |
| 2008/0235895 | A1 * | 10/2008 | Tajima ................ | 15/250.31 |

FOREIGN PATENT DOCUMENTS

| JP | 2000-135971 A | 5/2000 |
| JP | 2009-179132 A | 8/2009 |

* cited by examiner

*Primary Examiner* — Mark Spisich
*Assistant Examiner* — Andrew A Horton
(74) *Attorney, Agent, or Firm* — McCormick, Paulding & Huber LLP

(57) ABSTRACT

In a wiper apparatus, a gear case of a gear part is provided with a first frame fixing part which is fixed to a frame member by fastening volts and fastening nuts. An attachment bracket has a second frame fixing part which is fixed to the frame member together with the first frame fixing part by the fastening volts and the fastening nuts, and has an insertion pin which is fixed to a rear-side vehicle-body panel. A wiper motor can be fixed to the frame member together with the attachment bracket by the same fastening members, and it is possible to reduce the weight of the wiper apparatus by reducing the number of the fastening members. It is possible to enhance the productivity of the wiper apparatus by reducing the size of the attachment bracket separated as a dedicated part from the gear case.

5 Claims, 11 Drawing Sheets

WIPER APPARATUS

TECHNICAL FIELD OF THE INVENTION

The present invention relates to a wiper apparatus for driving and swinging a wiper arm by an electric motor and wiping off substances attached on a windshield.

BACKGROUND OF THE INVENTION

Conventionally, a wiper apparatus is mounted on a vehicle such as an automobile. The wiper apparatus is configured to drive and swing a wiper arm to which a wiper blade is attached, and to wipe off substances such as rainwater and dust attached on a windshield. The wiper apparatus is provided with a pivot shaft to which an end part of the wiper arm is fixed, and with an electric motor which drives the pivot shaft. When an operation switch in the interior of the vehicle is operated, the electric motor is driven, and as a result, the wiper blade is configured to be swung via the pivot shaft.

A wiper apparatus provided with wiper arms in a driver-seat side and a front passenger-seat side, respectively, is provided with pivot shafts corresponding to the respective wiper arms. A link mechanism is provided between the pivot shafts and the electric motor, and the rotary motion of the electric motor is converted to swinging motion by the link mechanism, and the pivot shafts are configured to be swung in synchronization. This wiper apparatus is known as so-called "frame-integrated-type modular-type wiper apparatus". In the modular-type wiper apparatus, a pair of pivot holders pivotally supporting the pivot shafts is fixed to both ends of a pipe-shaped frame member, and an electric motor is fixed to an approximately center part of the frame member (for example, see Japanese Patent Application Laid-Open No. 2009-179132 (FIG. 2) (hereinafter simply referred to as "Patent Document 1"), and Japanese Patent Application Laid-Open No. 2000-135971 (FIG. 3) (hereinafter simply referred to as "Patent Document 2")).

The wiper apparatus described in Patent Document 1 is provided with a wiper motor having a motor main body and a reducer. The wiper motor is fixed to a pipe-shaped frame member via a motor bracket, and a pair of pivot holders is fixed to both ends of the frame member. The motor bracket is integrally provided with a bracket attaching part which is inserted and fixed to a vehicle-body panel. The wiper apparatus is fixed to the vehicle body by inserting the bracket attaching part to the vehicle-body panel and fixing the pivot holders to predetermined locations of the vehicle-body panel by bolts.

The wiper apparatus described in Patent Document 2 is provided with a wiper motor having a motor part and a gear part, and the wiper motor is fixed to a hollow frame having ends to which pivot holders are fixed. A housing which forms the gear part is integrally provided with a pair of attachment legs and a support pin. The attachment legs of the housing are fixed to the hollow frame with bolts and nuts, and the support pin of the housing is inserted into an insertion hole in the vehicle-body side. The wiper apparatus is fixed to the vehicle body by inserting the support pin into the insertion hole and fixing the pivot holders to predetermined locations in the vehicle-body side with bolts.

SUMMARY OF THE INVENTION

However, according to the above described wiper apparatus described in Patent Document 1, the wiper motor is fixed to a bracket main body of the motor bracket with a plurality of bolts, and a frame fixing part of the motor bracket is fixed to a frame member with a plurality of bolts. Therefore, the number of the bolts in the whole wiper apparatus is large, the operation of assembling the wiper apparatus is complex, the yield rate thereof is relatively low, and in addition, it encounters a problem that the weight of the wiper apparatus is increased by them. Moreover, since the motor bracket is integrated with the bracket attaching part, the motor bracket has to be formed in accordance with the attachment structure of each vehicle type. Furthermore, the motor bracket is large since the motor bracket is composed of the bracket main body, the frame fixing part, and the bracket attaching part, and it encounters a problem that parts management becomes difficult (reduction in productivity).

On the other hand, according to the above described wiper apparatus described in Patent Document 2, since the housing which forms the gear part is fixed to the hollow frame with the plurality of bolts and nuts, the wiper motor can be directly fixed to the hollow frame without the intermediation of the motor bracket. Therefore, compared with the technique of Patent Document 1, since the motor bracket is not provided to the wiper apparatus described in Patent Document 2, reduction in weight of the wiper apparatus can be realized by reducing the number of bolts corresponding to the motor bracket, and it is possible to improve assembling performance. However, in the wiper apparatus described in Patent Document 2, since the support pin, which is inserted into the insertion hole in the vehicle-body side, is integrated with the housing, the housing has to be formed in accordance with the attachment structure of each vehicle type as well as Patent Document 1, and it encounters a problem that this causes reduction in productivity.

It is therefore an object of the present invention to provide a wiper apparatus which can be improved in productivity and reduced in weight.

A wiper apparatus according to the present invention for driving and swinging a wiper arm by an electric motor and wiping off substances attached on a windshield comprises: a motor part that forms the electric motor and is provided with a rotation shaft; a gear part that forms the electric motor and is provided with a speed-reducing mechanism that reduces a rotation speed of the rotation shaft; a pivot shaft to which drive force from an output shaft provided to the speed-reducing mechanism is transmitted, and to which an end part of the wiper arm is fixed; a pivot holder that is fixed to a fixation object to which the wiper apparatus is fixed, and that swingably retains the pivot shaft; a frame member that is coupled to the pivot holder for fixing the electric motor to the pivot holder; a first frame fixing part that is provided to a gear case forming the gear part, and that is fixed to the frame member via a fastening member; and an attachment bracket provided with a second frame fixing part and a bracket fixing part, wherein the second frame fixing part is fixed to the frame member via the fastening member together with the first frame fixing part, and the bracket fixing part is fixed to the fixation object.

In the wiper apparatus according to the present invention, the frame member may be held between the first frame fixing part and the second frame fixing part.

In the wiper apparatus according to the present invention, the first frame fixing part and the second frame fixing part may be fixed by fastening members that penetrate through the frame member.

In the wiper apparatus according to the present invention, the bracket fixing part may be an insertion pin that is inserted and fixed to the fixation object.

In the wiper apparatus according to the present invention, the bracket fixing part may be a screw-fixing part that is fixed by bolts to the fixation object.

According to the wiper apparatus of the present invention, in the gear case forming the gear part, the first frame fixing part fixed to the frame member via the fastening member is provided, and the attachment bracket provided with the second frame fixing part, which is fixed to the frame member via the fastening member together with the first frame fixing part, and the bracket fixing part, which is fixed to the fixation object, are provided. Therefore, the electric motor having the first frame fixing part and the attachment bracket having the second frame fixing part can be fixed to the frame member together by the same fastening member, and the number of fastening members can be reduced compared with conventional cases to reduce the weight of the device. Since the gear case and the attachment bracket are separated from each other, the gear case can serve as a common part, and the attachment bracket can serve as a dedicated part. Furthermore, since the attachment bracket can be downsized compared with conventional motor brackets and housings, parts management can be simplified to improve productivity.

BRIEF DESCRIPTIONS OF THE DRAWINGS

DESCRIPTIONS OF THE PREFERRED EMBODIMENTS

Hereinafter, the first embodiment of the present invention will be described in detail with reference to the drawings.

Figure 1:
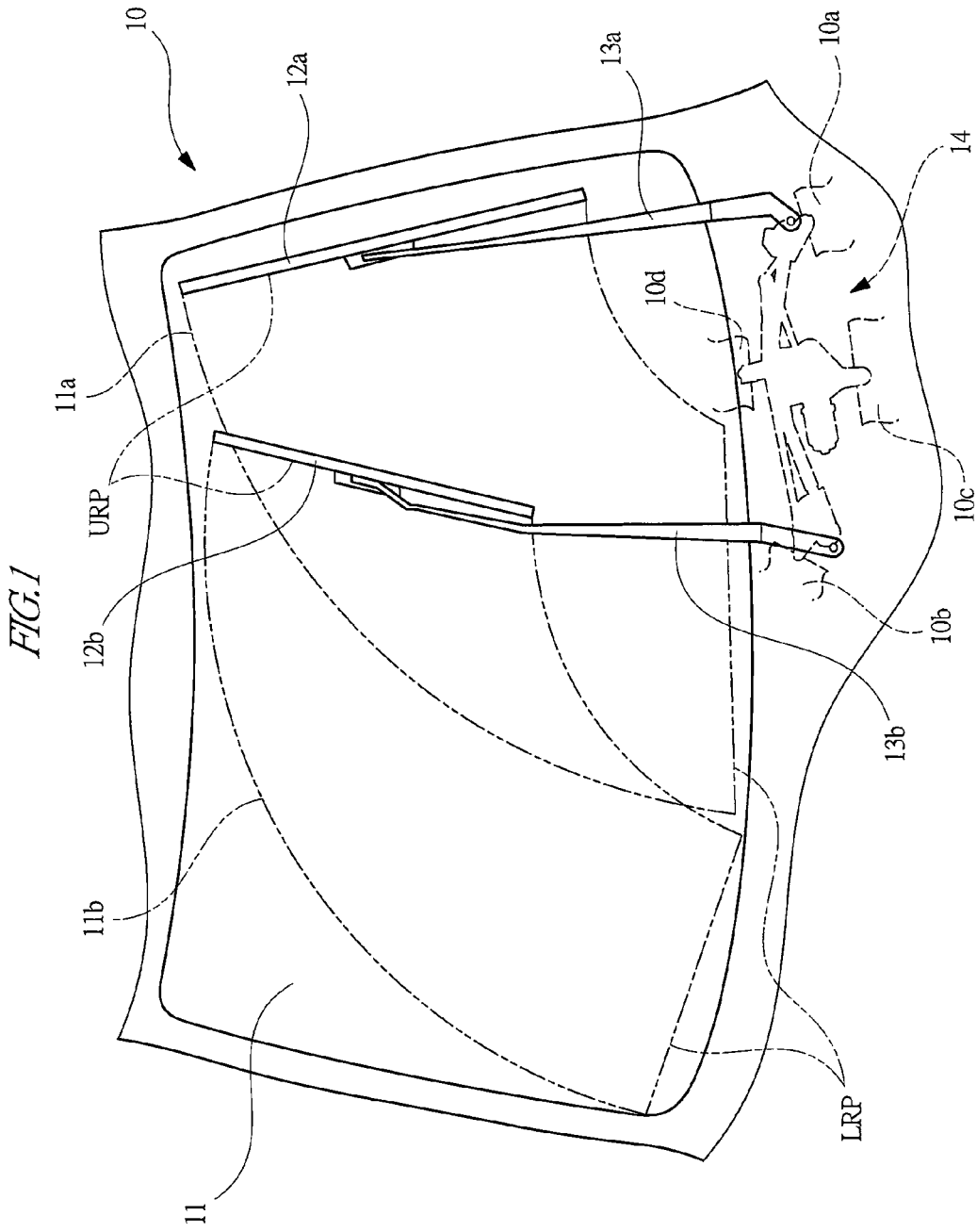
FIG. 1 is a view explaining a front side of a vehicle provided with a wiper apparatus according to the present invention.
Figure 2:
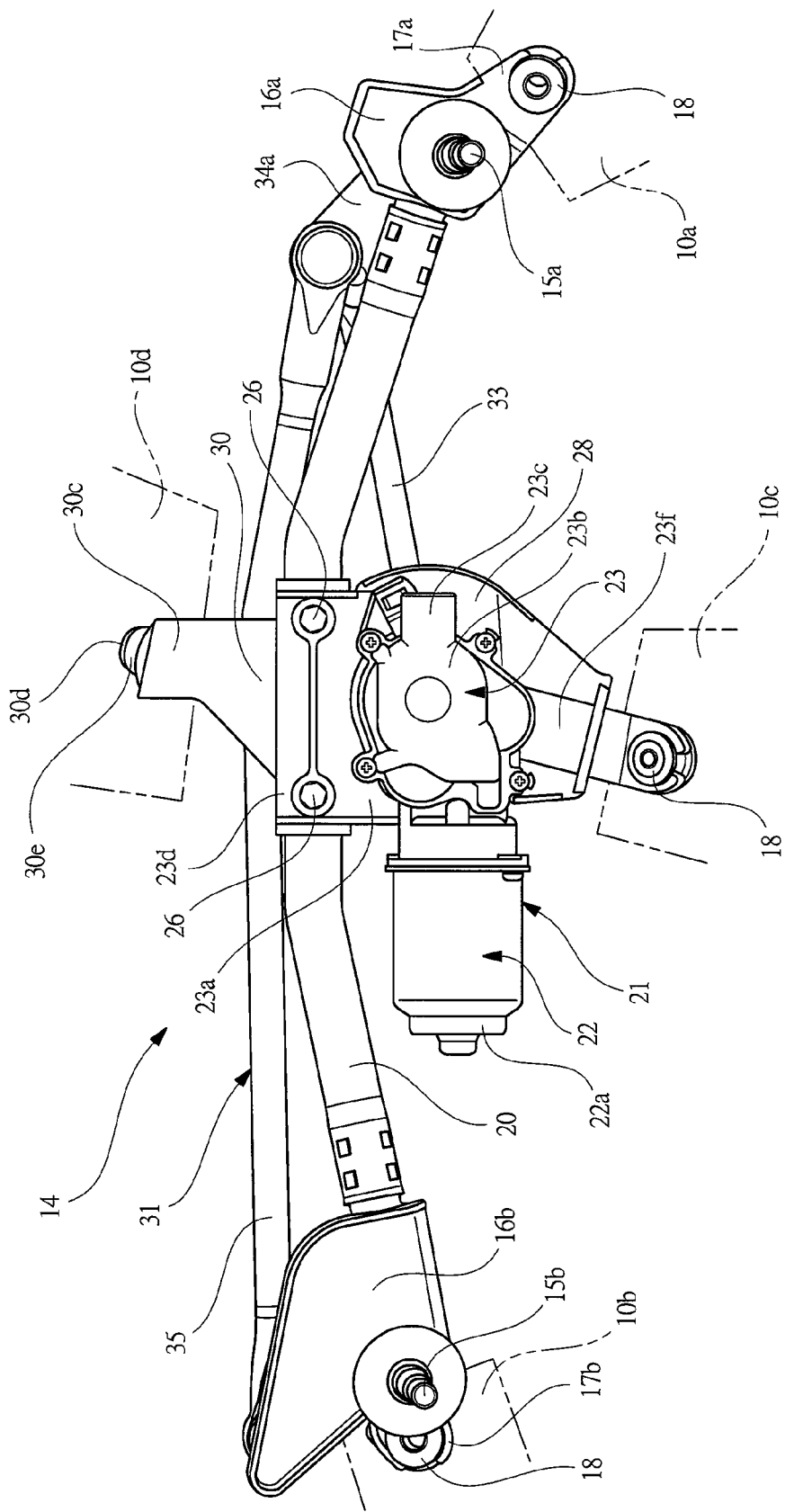
FIG. 2 is a schematic front view of the wiper apparatus seen from its front side.
Figure 3:
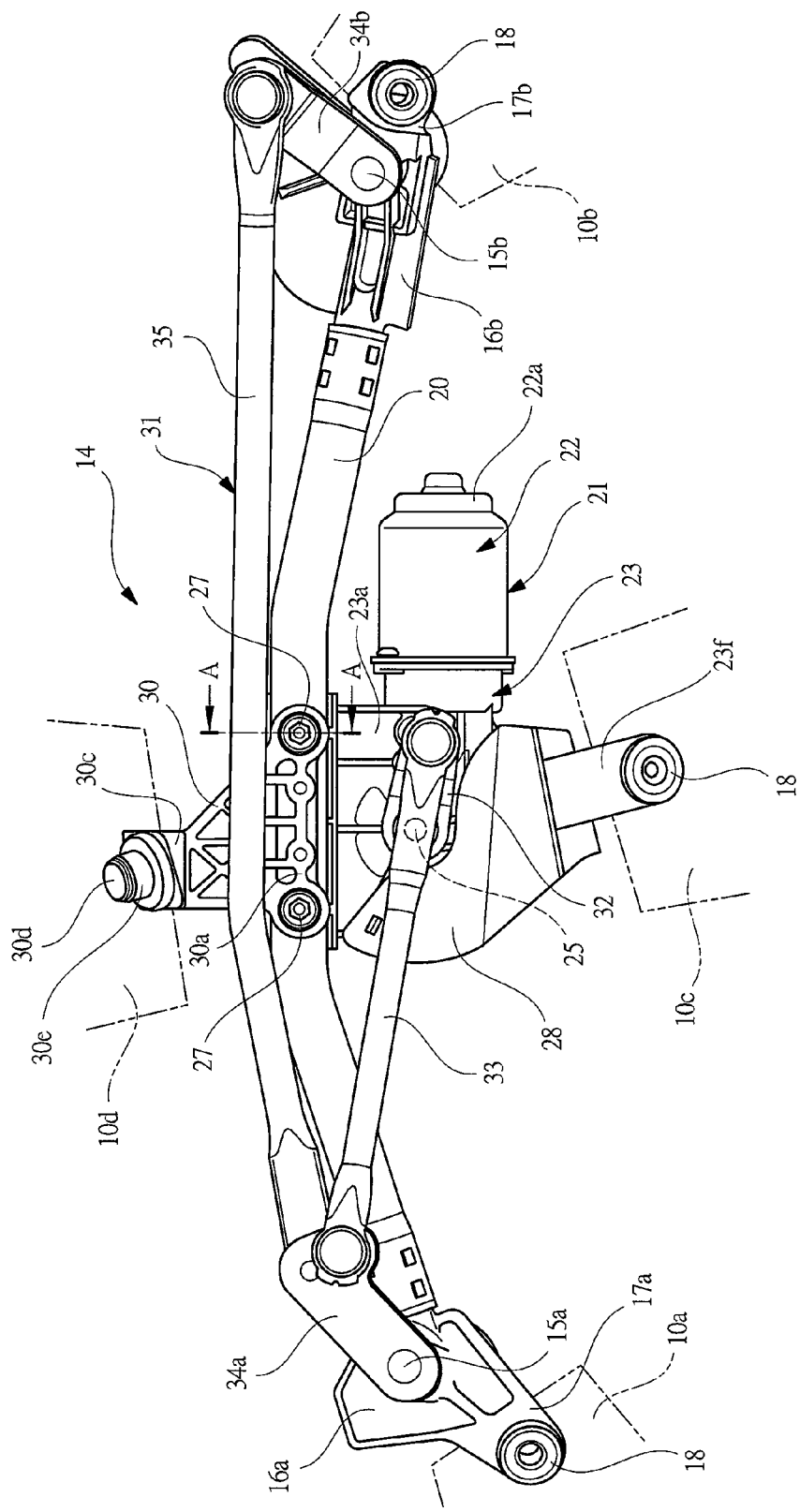
FIG. 3 is a schematic rear view of the wiper apparatus seen from its rear side.
Figure 4:
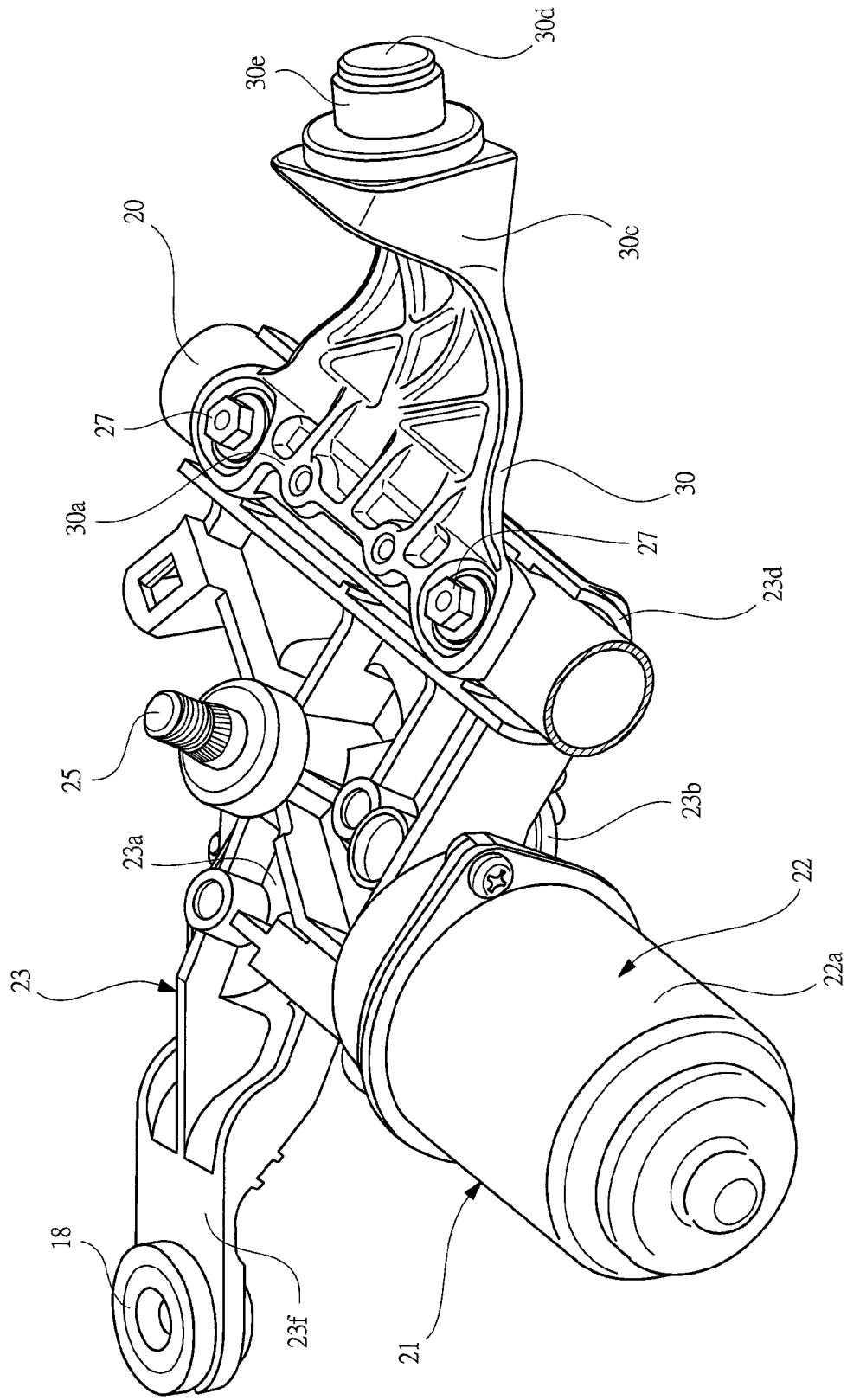
FIG. 4 is an enlarged perspective view of a portion including a wiper motor (a link mechanism is omitted)
Figure 5:
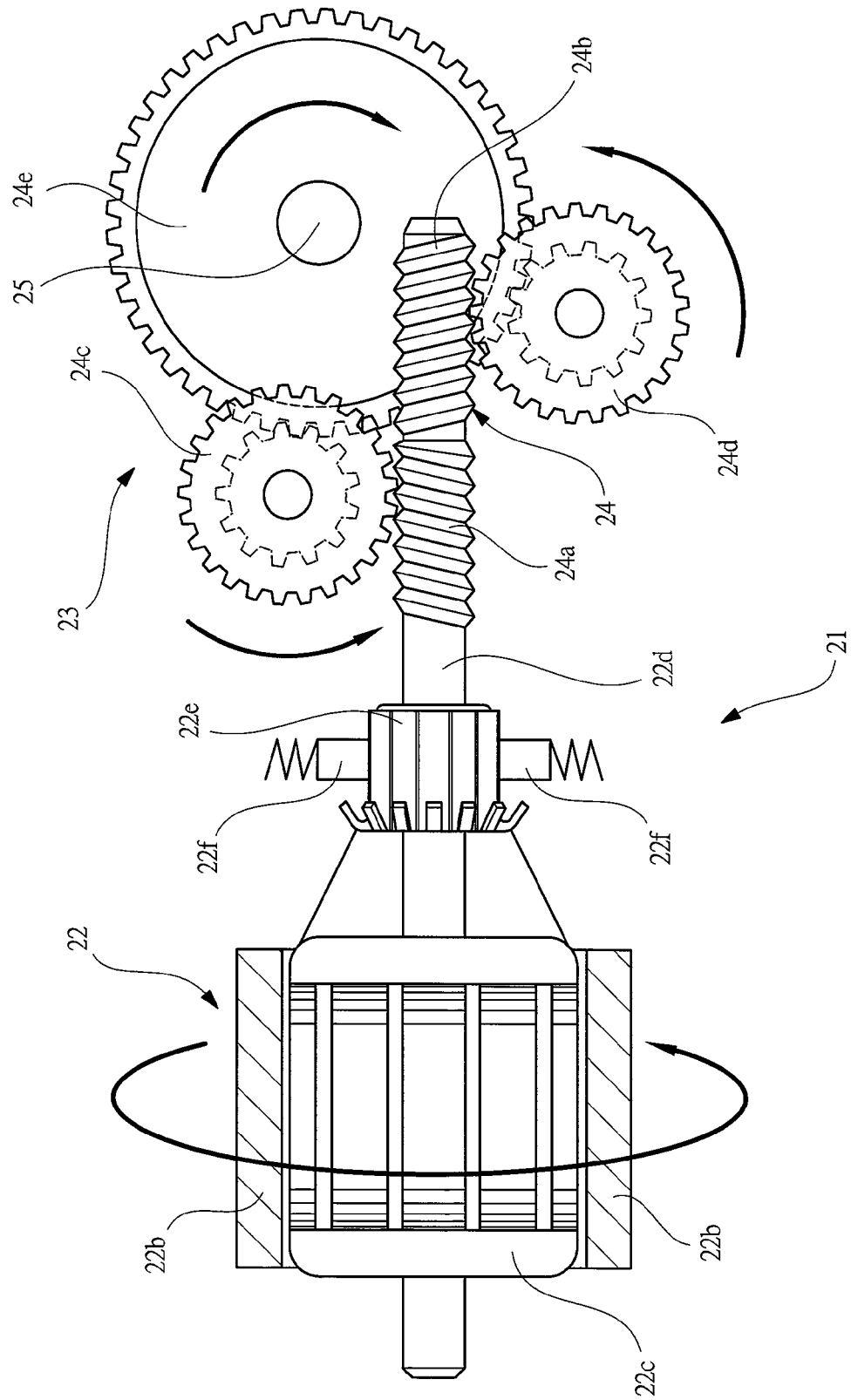
FIG. 5 is a view explaining an internal structure of the wiper motor.
Figure 6:
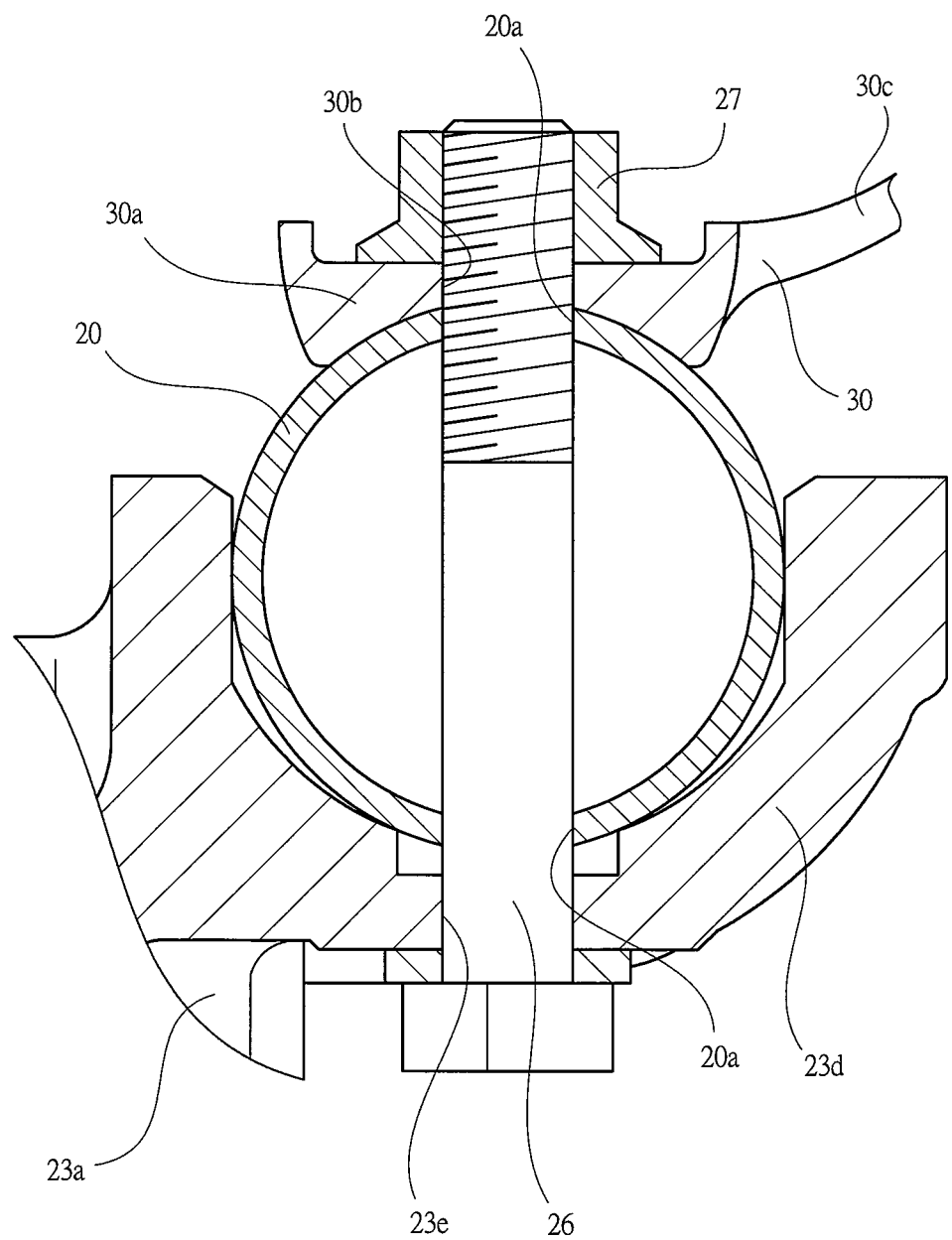
FIG. 6 is an enlarged fragmentary sectional view taken along the line A-A of FIG. 3.
Figure 7:
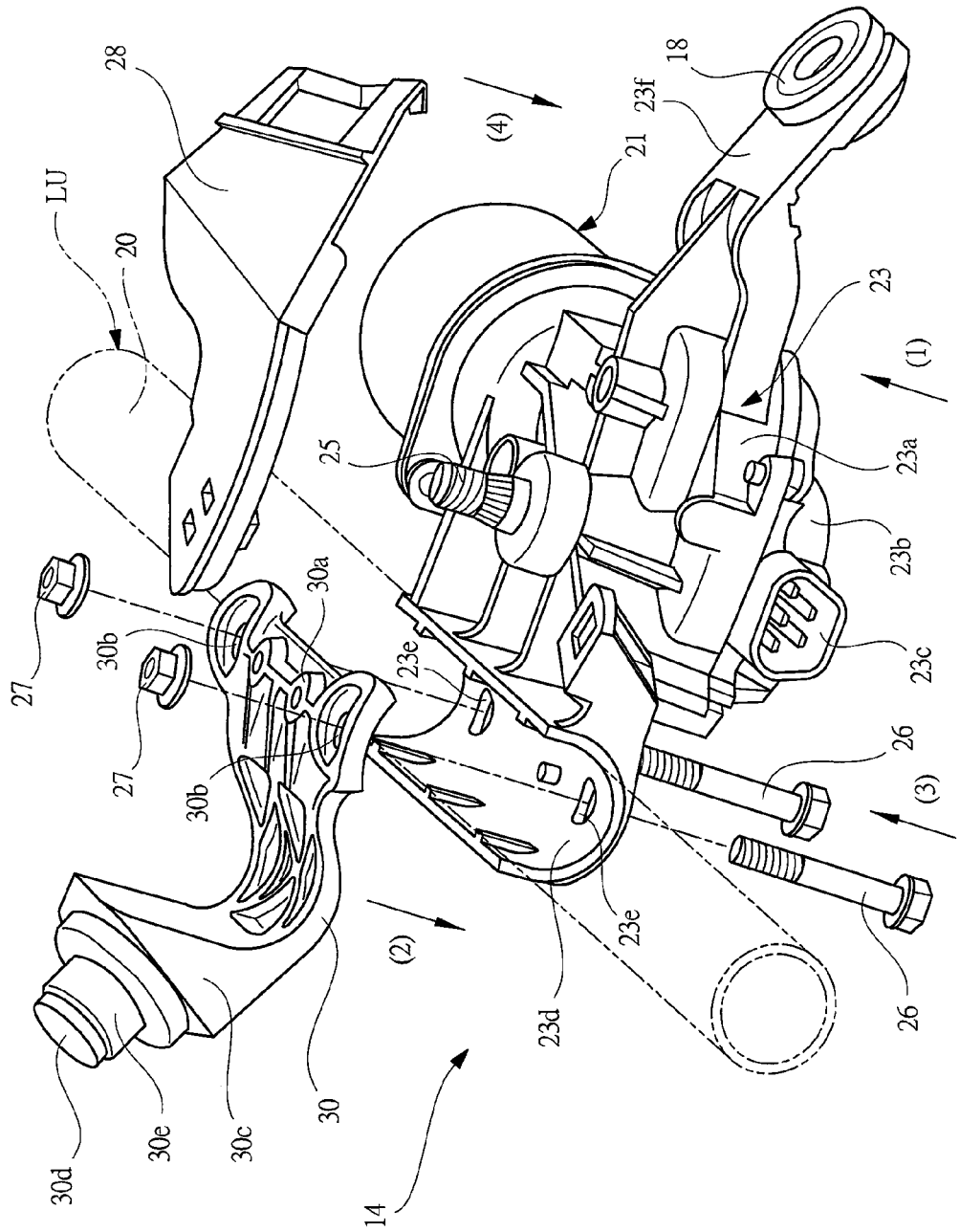
FIG. 7 is a view explaining an assembling procedure of the wiper apparatus.

FIG. 1 is a view explaining a front side of a vehicle provided with a wiper apparatus according to the present invention, FIG. 2 is a schematic front view of the wiper apparatus seen from its front side, FIG. 3 is a schematic rear view of the wiper apparatus seen from its rear side, FIG. 4 is an enlarged perspective view of a portion including a wiper motor (a link mechanism is omitted), FIG. 5 is a view explaining an internal structure of the wiper motor, FIG. 6 is an enlarged fragmentary sectional view taken along the line A-A of FIG. 3, and FIG. 7 is a view explaining an assembling procedure of the wiper apparatus.

As shown in FIG. 1, a windshield 11 is provided to a front side portion of a vehicle 10. A driver-seat side (hereinafter simply referred to as "DR-side") wiper blade 12a and a front passenger-seat side (hereinafter simply referred to as "AS-side") wiper blade 12b which wipe off rainwater, dust and the like attached on the windshield 11, are provided on the windshield 11.

The DR-side wiper blade 12a is pivotably attached to a distal-end side of a DR-side wiper arm 13a, and the AS-side wiper blade 12b is pivotably attached to a distal-end side of an AS-side wiper arm 13b. The wiper blades 12a and 12b are configured to be brought into elastic contact with the windshield 11 by coil springs (not shown) provided to the wiper arms 13a and 13b, respectively.

The wiper blades 12a and 12b are configured to perform a reciprocating wiping operation in synchronization with each other within respective wiping ranges 11a and 11b formed between lower reversing positions LRP and upper reversing positions URP on the windshield 11. In other words, the wiping patterns of the wiper blades 12a and 12b are a tandem type.

A wiper apparatus 14 (broken line in the drawing), which drives the wiper arms 13a and 13b to cause them to perform the reciprocating wiping operation, is mounted to the vehicle 10. As shown in FIG. 2, the wiper apparatus 14 is a so-called frame-integrated-type modular-type wiper apparatus in which a wiper motor 21 is fixed to an approximately center part of the frame member 20.

As shown in FIGS. 2 and 3, the wiper apparatus 14 is provided with a DR-side pivot shaft 15a to which an end part of the DR-side wiper arm 13a is fixed, and an AS-side pivot shaft 15b to which an end part of the AS-side wiper arm 13b is fixed. The DR-side pivot shaft 15a is swingably retained by a DR-side pivot holder 16a, and the AS-side pivot shaft 15b is swingably retained by an AS-side pivot holder 16b.

The DR-side pivot holder 16a is integrally formed with a DR-side holder attaching part 17a for fixing the DR-side pivot holder 16a to a DR-side vehicle-body panel (fixation object) 10a of the vehicle 10. A bush 18 made of rubber is attached to the DR-side holder attaching part 17a, and the DR-side pivot holder 16a is fixed to the DR-side vehicle-body panel 10a by inserting a bolt (not shown) into the bush 18 and fixing the bolt to the DR-side vehicle-body panel 10a.

The AS-side pivot holder 16b is integrally formed with an AS-side holder attaching part 17b for fixing the AS-side pivot holder 16b to a AS-side vehicle-body panel (fixation object) 10b of the vehicle 10. A bush 18 similar to that of the DR side is attached to the AS-side holder attaching part 17b, and the AS-side pivot holder 16b is fixed to the AS-side vehicle-body panel 10b by inserting a bolt (not shown) into the bush 18 and fixing the bolt to the AS-side vehicle-body panel 10b.

A frame member 20 extending in the vehicle-width direction of the vehicle 10 is provided between the pivot holders 16a and 16b. The frame member 20 couples the pivot holders 16a and 16b so that the pivot holders are at predetermine relative positions with respect to each other. Therefore, when frame members 20 having different shapes are prepared, different assembling space in the vehicle 10 side can be supported while the constituent parts other than the frame members 20 are serving as common parts.

The frame member 20 is formed of a hollow cylindrical pipe to have a predetermined shape, and coupling bosses (not shown) integrally provided with the pivot holders 16a and 16b are fixed by swaging at both-end sides of the frame member. The frame member 20 is not limited to the hollow cylindrical pipe, and for example, a hollow member or a solid member having a hexagonal cross sectional shape can be also used in consideration of, for example, rigidity required for the frame member 20.

The wiper motor 21 as an electric motor is fixed to an approximately center part of the frame member 20. The wiper motor 21 is adapted to drive the pivot shafts 15a and 15b and provided with a motor part 22 and a gear part 23.

As shown in FIGS. 4 and 5, the motor part 22 is provided with a yoke 22a formed of magnetic material to have a bottomed cylindrical shape, and a plurality of permanent magnets 22b (only two are shown in the drawing) are provided to the yoke 22a. A rotor 22c is rotatably provided at the inner side of the permanent magnets 22b with a predetermined gap therebetween. A rotation shaft 22d is fixed at the rotation center of the rotor 22c so as to penetrate therethrough, and a commutator 22e is fixed to an approximately center part along the axial direction of the rotation shaft 22d. A plurality of brushes 22f (only two are shown in the drawing) are configured to be in sliding contact with the commutator 22e, and the motor part 22 serves as an electric motor equipped with brushes.

A pair of worms 24a and 24b is integrally provided to the gear part 23 side along the longitudinal direction of the rotation shaft 22d, and the worms 24a and 24b are meshed with a pair of counter gears 24c and 24d, respectively. The counter gears 24c and 24d are also meshed with a worm wheel 24e; therefore, the rotation of the rotation shaft 22d is reduced to a predetermined speed to increase torque, which is output to outside from an output shaft 25 (see FIG. 4 for details) provided at the worm wheel 24e. A speed-reducing mechanism 24 is composed of the worms 24a and 24b, the counter gears 24c and 24d, and the worm wheel 24e.

As shown in FIGS. 2 to 4, the gear part 23 is provided with a gear case 23a made of aluminum, and a gear cover 23b made of plastic and adapted to cover an opening of the gear case 23a. The speed-reducing mechanism 24 (see FIG. 5) is housed in the gear case 23a. A power-feeding connector 23c is integrally provided with the gear cover 23b, and a drive current from a vehicle-mounted controller (not shown) is supplied to the power-feeding connector 23c. Thus, the motor part 22 is subjected to rotary drive.

The gear case 23a is integrally provided with a first frame fixing part 23d which is fixed to an approximately center part of the frame member 20. As shown in FIG. 6, the first frame fixing part 23d is formed so that a cross sectional shape thereof along a radial direction of the frame member 20 has an approximately arc shape, and the first frame fixing part is configured to cover approximately half of the frame member 20 along the peripheral direction thereof in the state in which the first frame fixing part is attached to the frame member 20. The first frame fixing part 23d is extending along the longitudinal direction of the frame member 20, and a pair of bolt holes 23e (see FIG. 7 for details) through which a pair of fastening bolts 26 respectively penetrates is formed in the vicinities of longitudinal-direction both ends of the first frame fixing part 23d.

In addition, the fastening bolts 26 penetrate through frame through holes 20a radially provided to the frame member 20, and fastening nuts 27 are coupled to distal end parts (screw parts) of the fastening bolts 26, respectively. The fastening bolts 26 and the fastening nuts 27 constitute fastening members in the present invention.

On the side (lower side in FIG. 2) opposite to the first frame fixing part 23d in the gear case 23a, an attachment leg 23f to be fixed to a front-side vehicle-body panel (fixation object) 10c of the vehicle 10 is integrally provided. A bush 18 similar to those attached to the holder attaching parts 17a and 17b is attached to the attachment leg 23f. And then the gear case 23a is fixed to the front-side vehicle-body panel 10c by inserting a bolt (not shown) into the bush 18 and fixing the bolt to the front-side vehicle-body panel 10c.

Here, on the same side (back side in FIG. 2) of the gear case 23a as the projecting output shaft 25, a waterproof cover 28 made of plastic is attached to the gear case 23a. The waterproof cover 28 covers a ball joint (not shown), which is a connecting part of a crank arm 32 and a drive connecting rod ("drive conn-rod") 33 constituting a link mechanism 31, so as to protect against rainwater and the like. Therefore, it prevents grease (not shown) applied to the part of the ball joint from flowing from that part to prevent smooth operation of the link mechanism 31 from being disturbed.

As shown in FIGS. 2 to 4, an attachment bracket 30 made of aluminum is fixed to a part of the frame member 20 at which the gear case 23a is fixed. The attachment bracket 30 is integrally provided with a second frame fixing part 30a fixed to an approximately center part of the frame member 20. As shown in FIG. 6, the second frame fixing part 30a is formed so that a cross sectional shape thereof along the radial direction of the frame member 20 has an approximately arc shape, and the second frame fixing part is configured to cover approximately one fourth of the frame member 20 along the peripheral direction thereof in the state in which the second frame fixing part is attached to the frame member 20. The second frame fixing part 30a is extending along the longitudinal direction of the frame member 20 as well as the first frame fixing part 23d, and a pair of bolt holes 30b (see FIG. 7 for details) through which the pair of fastening bolts 26 respectively penetrates is formed in the vicinities of longitudinal-direction both ends of the second frame fixing part 30a.

As shown in FIG. 6, the second frame fixing part 30a is disposed between the frame member 20 and the fastening nuts 27. In other words, together with the first frame fixing part 23d, the second frame fixing part 30a is configured to hold the frame member 20 by the fastening force of the fastening bolts 26 and the fastening nuts 27. In this manner, together with the first frame fixing part 23d, the second frame fixing part 30a is fixed to the frame member 20 by the fastening bolts 26 and the fastening nuts 27.

Therefore, since the first frame fixing part 23d and the second frame fixing part 30a hold the frame member 20, if twisting load is applied to the frame fixing parts 23d and 30a, for example, upon actuation of the wiper apparatus 14, the load can be dispersed in the longitudinal-direction both-end sides of the fastening bolts 26. Therefore, the fastening bolts 26 are not required to be formed of material having high rigidity.

Moreover, since the first frame fixing part 23d and the second frame fixing part 30a are fixed by the fastening bolts 26 which penetrate through the frame member 20, and the fastening nuts 27 which are coupled with the fastening bolts 26, when the wiper motor 21 is subjected to maintenance, only the wiper motor 21 can be easily detached from the vehicle 10.

An extending part 30c extending to the back side of the vehicle 10 is integrally provided to the side (upper side in FIG. 2) opposite to the second frame fixing part 30a in the attachment bracket 30. The extending part 30c is disposed so as to be opposed to the attachment leg 23f with the frame member 20 interposed therebetween. An insertion pin (bracket fixing part) 30d, which is inserted in and fixed to an insertion hole (not shown) provided to a rear-side vehicle-body panel (fixation object) 10d of the vehicle 10, is integrally provided at a distal end side of the extending part 30c. A buffer cap 30e made of rubber is attached to the insertion pin 30d; by virtue of this, the insertion pin 30d can be inserted in and fixed to the insertion hole of the rear-side vehicle-body panel 10d in a fitted state, and rattling of the insertion pin 30d with respect to the rear-side vehicle-body panel 10d is prevented.

As shown in FIG. 4, the extending part 30c of the attachment bracket 30 is formed into a concave shape. Therefore, by forming the extending part 30c into a concave shape, the extending part 30c is prevented from being brought into contact with a coupling rod 35 in swinging motion, the coupling rod 35 forming the link mechanism 31. In other words, the extending part 30c is disposed across the coupling rod 35 so as to allow swinging motion of the coupling rod 35.

As shown in FIGS. 2 and 3, the link mechanism 31 for converting the rotary motion of the output shaft 25 to the swinging motion of the pivot shafts 15a and 15b is provided between the output shaft 25 of the wiper motor 21 and the pivot shafts 15a and 15b. The link mechanism 31 is provided with the crank arm 32, and one end side of the crank arm 32 is fixed to the output shaft 25. The other end side of the crank arm 32 is rotatably coupled to the former end side of the drive connecting rod 33 via the ball joint.

One end side of a driver-side drive lever 34a is fixed to the DR-side pivot shaft 15a, and one end side of a passenger-side drive lever 34b is fixed to the AS-side pivot shaft 15b. The other end sides of the drive levers 34a and 34b are coupled to each other by the coupling rod 35 formed of a hollow cylindrical pipe via ball joints (not shown). The other end side of the drive connecting rod 33 is rotatably coupled to the other end side of the DR-side drive lever 34a via a ball joint (not shown).

In this manner, the link mechanism 31 is composed of the crank arm 32, the drive connecting rod 33, the drive levers 34a and 34b, and the coupling rod 35, and these members are rotatably coupled. As a result, the pivot shafts 15a and 15b are configured to be swung in synchronization with each other in the same direction within a predetermined angle range along with rotary drive of the output shaft 25.

Next, a procedure of assembling the wiper apparatus 14 thus configured and a procedure of mounting the wiper apparatus 14 on the vehicle 10 will be explained in detail with reference to the drawings.

[Assembling Procedure]

First, as shown in FIG. 7, a link unit LU and the wiper motor 21 assembled in advance in respective assembling steps are prepared, the attachment bracket 30 and the waterproof cover 28 manufactured in advance in respective manufacturing steps are prepared, the pair of fastening bolts 26 and the pair of fastening nuts 27 are prepared, and a fastening tool (not shown) for fastening the fastening bolts 26 is prepared. In this case, as shown in FIG. 3, the link unit LU is an assembly in which the pivot holders 16a and 16b are fixed to the respective end sides of the frame member 20, and the link mechanism 31 is attached.

Then, as shown by an arrow (1) of FIG. 7, the same side of the wiper motor 21 as the projecting output shaft 25 is caused to approach to the first frame fixing part 23d of the gear case 23a from the same side of the link unit LU as the projecting pivot holders 16a and 16b so as to cover the frame member 20. In this process, the frame through holes 20a of the frame member 20 (see FIG. 6) and the bolt holes 23e of the first frame fixing part 23d are aligned.

As shown by an arrow (2) of FIG. 7, the second frame fixing part 30a of the attachment bracket 30 is caused to approach from the side opposite to the first frame fixing part 23d side in the frame member 20 to attach the second frame fixing part 30a to the frame member 20. In this process, the frame through holes 20a (see FIG. 6) of the frame member 20 and the bolt holes 30b of the second frame fixing part 30a are aligned.

Then, in the state where the bolt holes 23e of the first frame fixing part 23d, the frame through holes 20a of the frame member 20, and the bolt holes 30b of the second frame fixing part 30a are aligned, the fastening bolts 26 are inserted into them as shown by an arrow (3) of FIG. 7. Then, the fastening nuts 27 are fastened with the fastening bolts 26 with predetermined fastening torque by using the fastening tool. As a result, the wiper motor 21 and the attachment bracket 30 are firmly fixed with respect to the pivot holders 16a and 16b via the frame member 20.

Then, furthermore, as shown by an arrow (4) of FIG. 7, the waterproof cover 28 is caused to approach from the same side of the wiper motor 21 as the projecting output shaft 25 to attach the waterproof cover 28 to the gear case 23a of the wiper motor 21. Then, the crank arm 32 constituting the link mechanism 31 of the link unit LU and the output shaft 25 (see FIG. 3) are coupled to each other. Thus, assembly of the wiper apparatus 14 which is a modular-type wiper apparatus is completed.

[Mounting Procedure]

When the completed wiper apparatus 14 is attached to the vehicle-body panels 10a to 10d (see FIGS. 2 and 3) of the vehicle 10 for example in a vehicle body manufacturer, the insertion pin 30d is firstly inserted into the rear-side vehicle-body panel 10d, thereby positioning the wiper apparatus 14 with respect to the vehicle 10 (tentative fixation). In this process, the wiper apparatus 14 is positioned only by inserting the insertion pin 30d into the rear-side vehicle-body panel 10d; therefore, the tentative fixation of the wiper apparatus 14 to the vehicle 10 can be quickly and easily carried out. Then, the DR-side holder attaching part 17a, the AS-side holder attaching part 17b, and the attachment leg 23f are respectively fixed to the vehicle-body panels 10a to 10c (final fixation) by using bolts (not shown). In this way, the mounting of the wiper apparatus 14 to the vehicle body 10 is completed.

As described above in detail, in the wiper apparatus 14 according to the first embodiment, the first frame fixing part 23d, which is fixed to the frame member 20 via the fastening bolts 26 and the fastening nuts 27, is provided to the gear case 23a forming the gear part 23, the attachment bracket 30 is provided with the second frame fixing part 30a and the insertion pin 30d, the attachment bracket 30 is fixed to the frame member 20 via the fastening bolts 26 and the fastening nuts 27 together with the first frame fixing part 23d, and the insertion pin 30d is fixed to the rear-side vehicle-body panel 10d.

Therefore, the wiper motor 21 having the first frame fixing part 23d and the attachment bracket 30 having the second frame fixing part 30a can be fixed together to the frame member 20 by the same fastening bolts 26 and the fastening nuts 27, and the number of the fastening bolts 26 and the fastening nuts 27 can be reduced compared with conventional cases to reduce the weight of the wiper apparatus 14. Moreover, since the gear case 23a and the attachment bracket 30 are separated from each other, the gear case 23a can serve as a common part, and the attachment bracket 30 can serve as a dedicated part. Furthermore, since the attachment bracket 30 can be downsized compared with conventional motor brackets and housings, parts management can be simplified to improve productivity.

Figure 8:
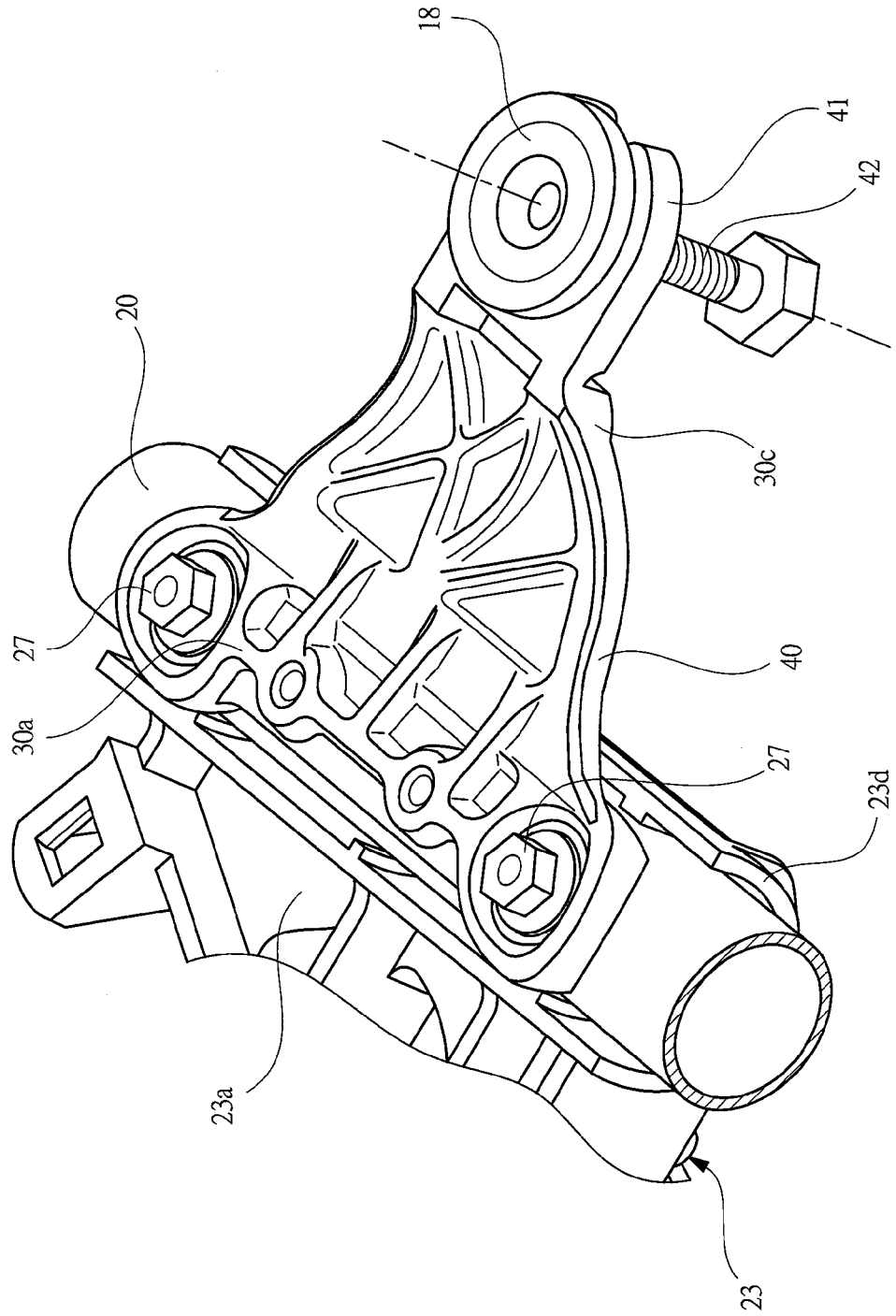
FIG. 8 is a perspective view of an attachment bracket according to the second embodiment.

Then, the second embodiment of the present invention will be described in detail with reference to the drawings. Additionally, portions having functions the same as those of the above described first embodiment are denoted by the same reference numbers as those of the first embodiment and the detail descriptions thereof are omitted here. FIG. 8 is a perspective view of an attachment bracket according to the second embodiment.

As shown in FIG. 8, an attachment structure 40 according to the second embodiment differs from that of the first embodiment in structure. A screw-fixing part (bracket fixing part) 41 is integrally provided at a distal end side of the extending part 30c of the attachment bracket 40, and a bush 18 made of rubber is attached to the screw-fixing part 41. The bush 18 attached to the screw-fixing part 41 is formed as well as the bushes 18 attached to the holder attaching parts 17a and 17b and the attachment leg 23f of the gear case 23a. The attachment bracket 40 is screwed and fixed to the rear-side vehicle-body panel 10d by inserting a bolt 42 into the bush 18 and fixing the bolt 42 to the rear-side vehicle-body panel 10d (see FIG. 2 and FIG. 3).

Also in the second embodiment thus configured, it is possible to have advantageous effects similar to those of the above described first embodiment. In addition, since the attachment bracket 40 is integrally formed with the screw-fixing part 41 which is screwed and fixed to the rear-side vehicle-body panel 10d by the bolt 42 in the second embodiment, the wiper apparatus 14 can be tentatively fixed to the vehicle 10 by the bolt 42. Therefore, even when the wiper apparatus 14 is mounted in an inclined state with respect to the vehicle 10, the wiper apparatus 14 can be prevented from falling off from the rear-side vehicle-body panel 10d, and the wiper apparatus 14 can be reliably subjected to final fixation to the vehicle 10.

Figure 9:
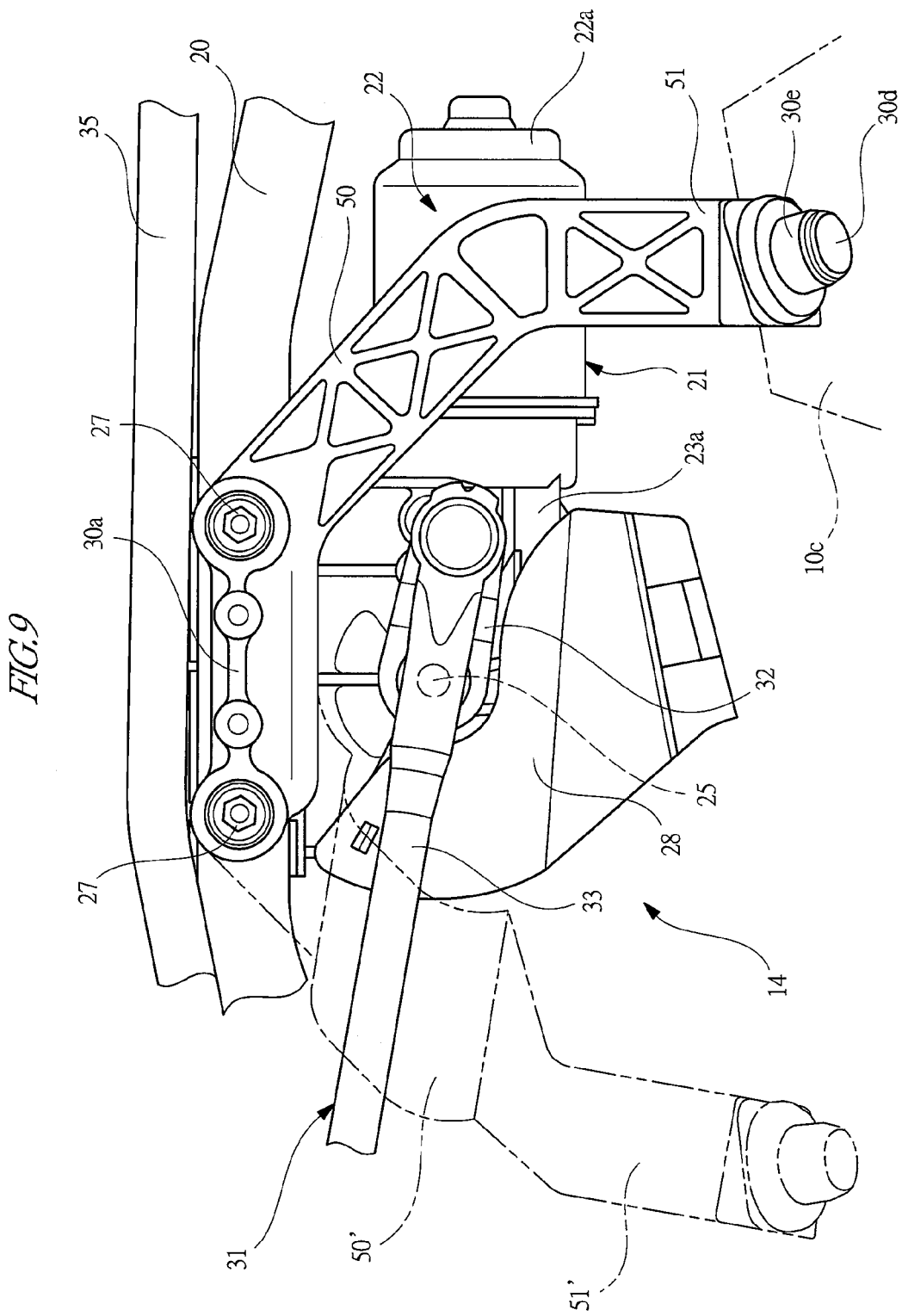
FIG. 9 is a schematic rear view of an attachment bracket according to the third embodiment.

Then, the third embodiment of the present invention will be described in detail with reference to the drawings. Additionally, portions having functions the same as those of the above described first embodiment are denoted by the same reference numbers as those of the first embodiment and the detail descriptions thereof are omitted here. FIG. 9 is a schematic rear view of an attachment bracket according to the third embodiment.

As shown in FIG. 9, an attachment structure 50 according to the third embodiment differs from that of the first embodiment in structure, and the attachment leg 23f of the gear case 23a is omitted. The attachment bracket 50 is formed into an approximately V-shape, and a distal end side of an extending part 51 provided to the attachment bracket 50 is directed to the front-side vehicle-body panel 10c of the vehicle 10 so as to extend across the motor part 22. The insertion pin 30d provided at the distal end side of the extending part 51 is inserted and fixed to an insertion hole (not shown) provided to the front-side vehicle-body panel 10c so that the wiper apparatus 14 can be tentatively fixed to the vehicle 10. In other words, in the first embodiment, the wiper apparatus 14 is tentatively fixed to the rear-side vehicle-body panel 10d (see FIG. 2 and FIG. 3); however, in the second embodiment, the wiper apparatus 14 is tentatively fixed to the front-side vehicle-body panel 10c. However, like an attachment bracket 50' shown by a two-dotted chain line in the drawing, the distal end side of an extending part 51' may be directed to the front-side vehicle-body panel 10c across the drive connecting rod 33 of the link mechanism 31.

Also in the third embodiment thus configured, it is possible to have advantageous effects similar to those of the above described first embodiment.

Figure 10:
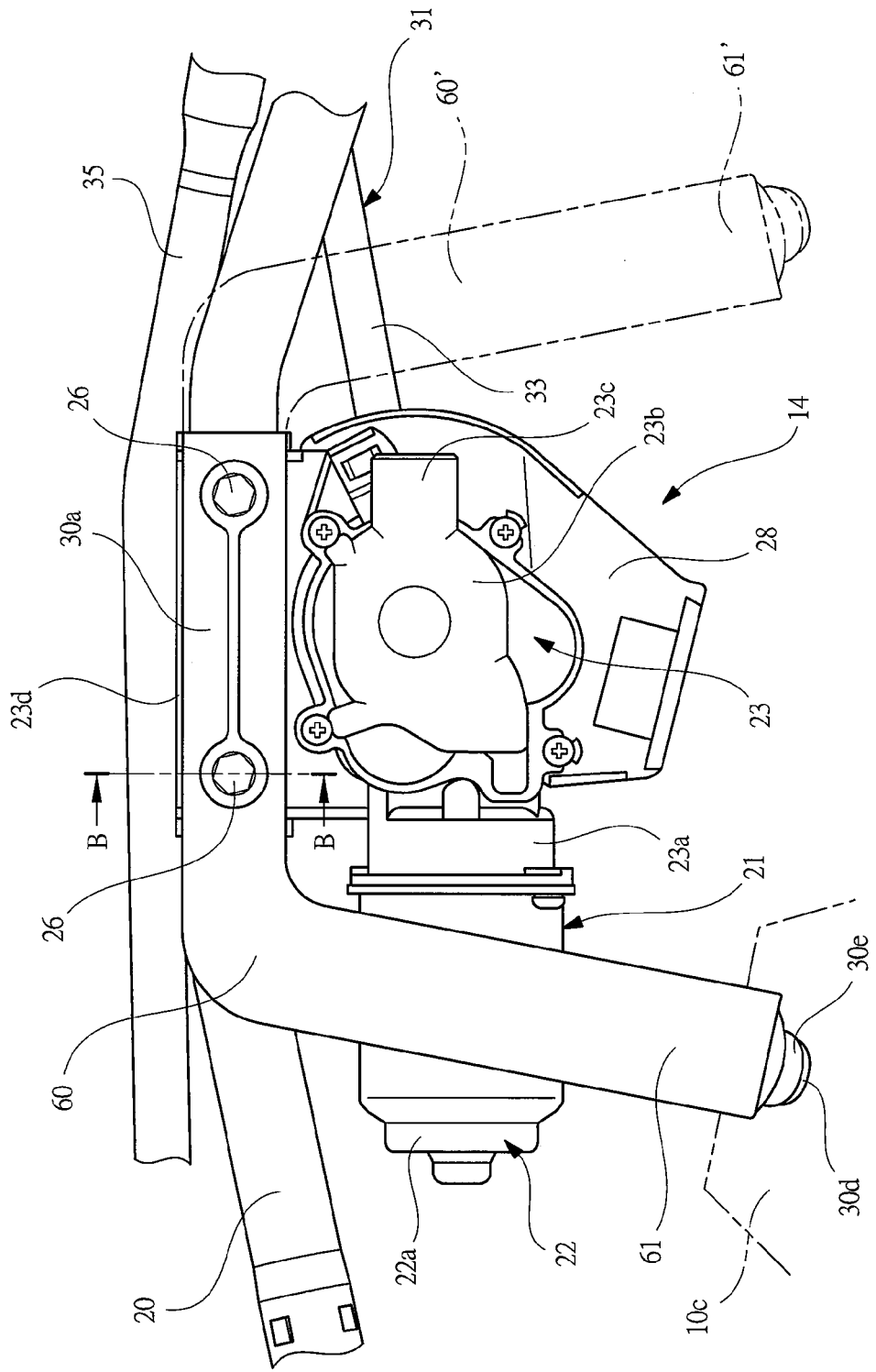
FIG. 10 is a schematic front view of an attachment bracket according to the fourth embodiment.
Figure 11:
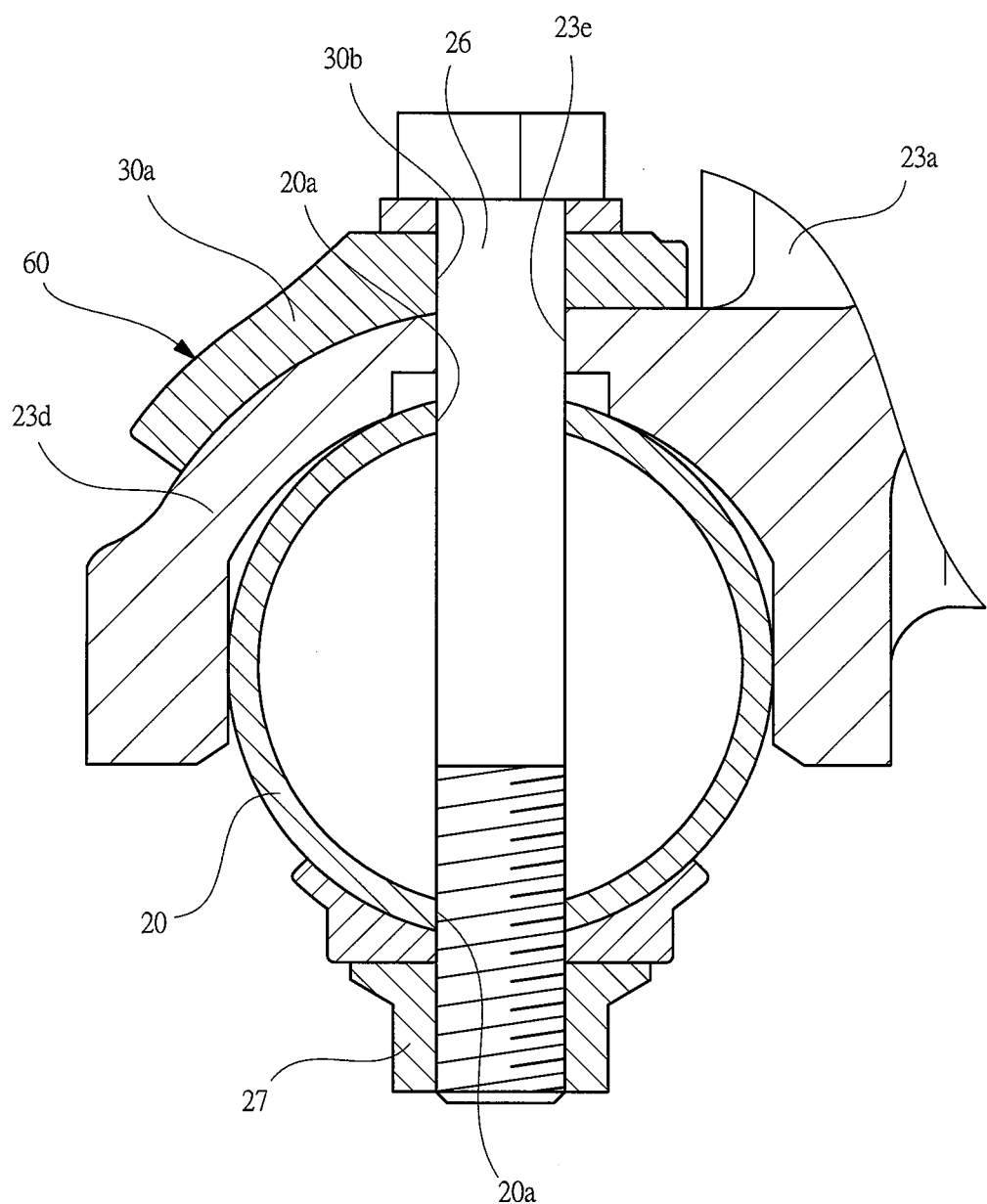
FIG. 11 is an enlarged fragmentary sectional view taken along the line B-B of FIG. 10.

Then, the fourth embodiment of the present invention will be described in detail with reference to the drawings. Additionally, portions having functions the same as those of the above described first embodiment are denoted by the same reference numbers as those of the first embodiment and the detail descriptions thereof are omitted here. FIG. 10 is a schematic front view of an attachment bracket according to the fourth embodiment, FIG. 11 is an enlarged fragmentary sectional view taken along the line B-B of FIG. 10.

As shown in FIG. 10, the fourth embodiment is different from the first embodiment in the structure of an attachment bracket 60, the attachment leg 23f of the gear case 23a being omitted, and the attachment bracket 60 which is disposed in the same side as the gear case 23a along the radial direction of the frame member 20. The attachment bracket 60 is formed so that the overall shape thereof is an approximately V-shape, and the second frame fixing part 30a of the attachment bracket 60 is overlapped with the first frame fixing part 23d of the gear case 23a as shown in FIG. 11. The second frame fixing part 30a and the first frame fixing part 23d are fastened together with the frame member 20 by the fastening bolts 26 and the fastening nuts 27 in the state in which they are mutually overlapped.

A distal end side of an extending part 61 provided to the attachment bracket 60 is directed to the front-side vehicle-body panel 10c of the vehicle 10 so as to extend across the motor part 22 as well as the third embodiment. The insertion pin 30d provided at the distal end side of the extending part 61 is inserted and fixed to an insertion hole (not shown) provided to the front-side vehicle-body panel 10c so that the wiper apparatus 14 can be tentatively fixed to the vehicle 10. However, like an attachment bracket 60' shown by a two-dotted chain line in the drawing, the distal end side of an extending part 61' may be directed to the front-side vehicle-body panel 10c across the drive connecting rod 33 of the link mechanism 31.

Also in the fourth embodiment thus configured, it is possible to have advantageous effects similar to those of the above described first embodiment. In addition, in the fourth embodiment, since the second frame fixing part 30a and the first frame fixing part 23d are overlapped and disposed in the same side along the radial direction of the frame member 20, the second frame fixing part 30a and the first frame fixing part 23d can be easily positioned with respect to the frame member 20, and, therefore, the workability of the wiper apparatus 14 can be further improved.

The present invention is not limited to the above described embodiments, and it goes without saying that various modifications can be made within the range not departing from the gist thereof. For example, in the above described embodiments, members made of aluminum are shown as the attachment brackets 30, 40, 50, and 60. However, the present invention is not limited to this example, and members formed by subjecting steel plates to pressing or members formed by subjecting a resin material having high hardness to injection molding may be used.

Moreover, the above described embodiments show the cases in which the gear case 23a is made of aluminum. However, the present invention is not limited to this feature. For example, a resin material having high hardness may be subjected to injection molding to form the gear case.

Furthermore, the above described first and second embodiments show the cases in which the attachment leg 23f is provided to the gear case 23a. However, the present invention is not limited to the above cases, and the attachment leg 23f can be omitted depending on, for example, the attachment rigidity of the wiper apparatus 14 with respect to the vehicle 10. The above described third and fourth embodiments show the cases in which the attachment leg 23f is omitted. However, the present invention is not limited to the above cases, and an attachment leg may be provided so as to project in the direction opposite to the extending direction of the extending part 51 or 61, in other words, to the upper side in FIG. 9 or 10. In that case, the attachment leg is projected so as not to be brought into contact with the coupling rod 35.

Furthermore, the above described fourth embodiment shows the case in which the fastening bolts 26 penetrate through the frame member 20 and are connected to the fastening nuts 27 as well as the other embodiments. However, the present invention is not limited to this example, and for example, in the structure in which the wiper motor 21 is fixed at end part of the frame member 20, the fastening nuts 27 may be fixed to the interior of the frame member 20 in advance by welding or the like. In this example, since it is possible to assemble the wiper apparatus 14 without a step of positioning the fastening nuts 27 with respect to the frame member 20, the assembling workability of the wiper apparatus 14 can be further improved. Moreover, since the length of the fastening bolts 26 can be shortened, the weight of the wiper apparatus 14 can be further reduced correspondingly.

Furthermore, the above described embodiments show the cases in which the wiping pattern of the wiper apparatus 14 is a tandem type. However, the present invention is not limited to this example, and another pattern such as an opposed wiping type can be also applied.

Furthermore, the above described embodiments show the cases in which the windshield 11 of the front side of the vehicle 10 is wiped. However, the present invention is not limited to this example, and the present invention can be also applied to a wiper apparatus that wipes a windshield (rear glass) provided to the rear side of the vehicle 10 or a windshield of a railway car or an airplane.

What is claimed is:

1. A wiper apparatus for driving and swinging a wiper arm by an electric motor and wiping off substances attached on a windshield, the wiper apparatus comprising:

a motor part that forms the electric motor and is provided with a rotation shaft;

a gear part that forms the electric motor and is provided with a speed-reducing mechanism that reduces a rotation speed of the rotation shaft;

a pivot shaft to which drive force from an output shaft provided to the speed-reducing mechanism is transmitted, and to which an end part of the wiper arm is fixed;

a pivot holder that is fixed to a fixation object to which the wiper apparatus is fixed, and that swingably retains the pivot shaft;

a frame member that has one end coupled to the pivot holder;

a first frame fixing part that is provided to a gear case forming the gear part, and that is fixed to the frame member via a fastening member; and an attachment bracket provided with a second frame fixing part and a bracket fixing part, wherein the second frame fixing part is fixed to a substantially central portion of the frame member via the fastening member together with the first frame fixing part, and the bracket fixing part is fixed to the fixation object.

2. The wiper apparatus according to claim 1, wherein the frame member is held between the first frame fixing part and the second frame fixing part.

3. The wiper apparatus according to claim 1, wherein the first frame fixing part and the second frame fixing part are fixed by fastening members that penetrate through the frame member.

4. The wiper apparatus according to claim 1, wherein the bracket fixing part is an insertion pin that is inserted and fixed to the fixation object.

5. The wiper apparatus according to claim 1, wherein the bracket fixing part is a screw-fixing part that is fixed by bolts to the fixation object.

\* \* \* \* \*